(12) United States Patent
Hales et al.

(10) Patent No.: US 7,039,823 B2
(45) Date of Patent: May 2, 2006

(54) ON-CHIP RESET CIRCUITRY AND METHOD

(75) Inventors: Alan D. Hales, Richardson, TX (US); Anthony M. Hill, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 467 days.

(21) Appl. No.: 10/422,275

(22) Filed: Apr. 24, 2003

(65) Prior Publication Data

US 2003/0204713 A1    Oct. 30, 2003

Related U.S. Application Data

(60) Provisional application No. 60/376,026, filed on Apr. 26, 2002.

(51) Int. Cl.
*G06F 1/12* (2006.01)

(52) U.S. Cl. .................. 713/400; 713/401; 713/500

(58) Field of Classification Search ............ 713/1, 713/400, 500, 600, 401

See application file for complete search history.

(56) References Cited

U.S. PATENT DOCUMENTS

| 3,867,613 | A | * | 2/1975 | Schoon | 377/10 |
| 4,161,787 | A | * | 7/1979 | Groves et al. | 710/260 |
| 6,075,392 | A | * | 6/2000 | Sandner | 327/145 |
| 6,108,778 | A | * | 8/2000 | LaBerge | 713/1 |
| 6,259,478 | B1 | * | 7/2001 | Hori | 348/296 |
| 6,308,229 | B1 | * | 10/2001 | Masteller | 710/52 |

* cited by examiner

*Primary Examiner*—Thomas Lee
*Assistant Examiner*—Malcolm D. Cribbs
(74) *Attorney, Agent, or Firm*—Robert D. Marshall, Jr.; W. James Brady, III; Frederick J. Telecky, Jr.

(57) ABSTRACT

An integrated circuit includes an external reset input, a clock input for receiving a clock signal and a reset signal sub-circuit including an internal reset output connected to other circuits of the integrated circuit. The reset signal sub-circuit immediately supplies an internal reset signal upon receipt of the external reset signal and ceases to supply the internal reset signal upon a next clock signal following ceasing to receive the external reset signal. This asynchronously forces combinational logic to a reset state upon receipt of the internal reset signal and synchronously forces sequential logic to a reset state upon receipt of a next clock signal.

5 Claims, 2 Drawing Sheets

ON-CHIP RESET CIRCUITRY AND METHOD

CLAIM OF PRIORITY

This application claims priority under 5 U.S.C. 119(e) (1) from U.S. Provisional Application Ser. No. 60/376,026 filed Apr. 26, 2002.

TECHNICAL FIELD OF THE INVENTION

The technical field of this invention is integrated circuit reset circuits and methods.

BACKGROUND OF THE INVENTION

Circuitry within integrated circuit devices typically have a need to be reset by activation of a reset input pin on the device to establish an initial state in the circuitry. Conventional reset operations are based on either an asynchronous reset style whereby the circuitry responds immediately to a reset pin activation or a synchronous reset style whereby the circuitry responds to a reset pin activation after the activation has been timed by a clock signal.

FIG. 1 illustrates a prior art integrated circuit 100 that includes a register 101 and logic 102. The register 101 receives data from bus 103 and outputs data on bus 104. The operation of register 101 is timed by a clock 109. Logic 102 receives input data from bus 104 and outputs data on bus 105. Logic 102 comprises combinational gating, represented by exemplary AND gate 108. The representative gate 108 receives input data from bus 104 and outputs data onto bus 105. The register 101 and logic 102 could be part of any type of digital circuits within the integrated circuit. Examples would include functional elements such as registers, arithmetic logic units (ALU), digital signal processors (DSP) or circuit elements included for test or emulation.

FIG. 1 illustrates a reset input pin 110 providing a reset signal to input buffer 106. The output of the buffer 106 drives the asynchronous reset input terminal 113 of the register 101. In this example, register 110 will be immediately reset in response to a logic low input on the reset pin 110. When register 101 is reset, it outputs a known data pattern to logic 102 via bus 104. Logic 102 responds by outputting a known data pattern on bus 105. FIG. 1 illustrates an example flip-flop 111 which is a part of register 101. Each flip flop 111 of register 101 has an input coupled to bus 103, an output coupled to bus 104, a clock input coupled to clock 109, and an asynchronous reset input coupled to buffer 106 output 112.

A pull up element 107 is connected to the input of buffer 106 to maintain a logical 'high' on the reset input pin 110 when it is not externally driven. In this example, pull up element 107 is shown as included on the integrated circuit, but it could be external to the integrated circuit. The pull-up resistor 107 helps prevent false reset inputs. However, noise produced in the system including the integrated circuit may reach sufficient levels to propagate through buffer 106 to cause a false reset of register 101. Further, the operation of the integrated circuit 100 itself can introduce noise on reset line 112, which can also cause false reset inputs to appear at the asynchronous input of register 101. The asynchronous reset approach of FIG. 1 immediately resets register 101 and logic 102, but has the disadvantage of being susceptible to false reset signals.

FIG. 2 illustrates a prior art integrated circuit 200 having a synchronous reset. Register 201 operates functionally the same as register 101 of FIG. 1. Register 201 receives input data from bus 103 and outputs data to bus 104 during the cycle of input clock 109. The difference between register 201 and register 101 is that register 201 includes exemplary flip-flops 203 that do not include the asynchronous reset input of flip-flops 111. The flip-flops 203 include AND gates 204 at their data inputs which input data from bus 103 during functional operation and force a reset input during reset operation. If the reset output 112 from buffer 106 is high, the flip-flops 203 receive normal input data from bus 103 via gate 204. When the reset output 112 is low, the flip-flops 203 are forced by gate 204 to receive input logic zeros. In circuit 200 and in circuit 100 of FIG. 1, this is the 'reset' state of registers 201 and 101.

Providing the reset signal as a data input to flip-flops 203, instead of as an asynchronous input to flip-flops 111 lessens the possibility of false resets occurring. However the synchronous reset approach of FIG. 2 delays the effect of the reset until the occurrence of a clock 109 signal.

SUMMARY OF THE INVENTION

This invention describes a new reset style that maintains the advantages of both synchronous and asynchronous reset techniques while eliminating the disadvantages of each. The circuitry described provides an immediate reset that is accomplished without introducing susceptibility to false reset caused by noise.

BRIEF DESCRIPTION OF THE DRAWINGS

These and other aspects of this invention are illustrated in the drawings, in which.

DETAILED DESCRIPTION OF PREFERRED EMBODIMENTS

Figure 3:
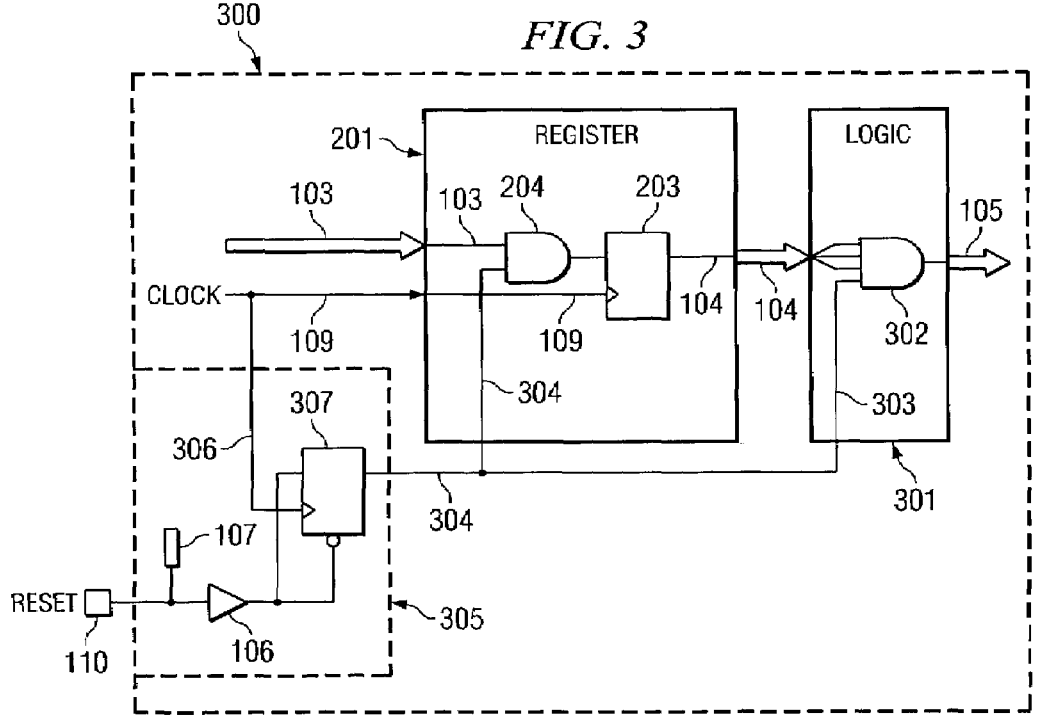
FIG. 3 illustrates the improved on-chip reset circuitry and method of this invention.

FIG. 3 illustrates the reset improvement according to this invention. The invention consists of an added circuit 305 and a modification to logic 301 of IC 300. Circuit 305 includes pull-up element 107, buffer 106, and flip-flop 307. Flip-flop 307 has an asynchronous reset input that is connected to the output of buffer 106. The data input of flip-flop 307 is also connected to the output of buffer 106. The output of flip-flop 307 drives a reset signal 304 to register 201 and modified logic 301. The clock input of flip-flop 307 is connected to clock signal 109.

Figure 1:
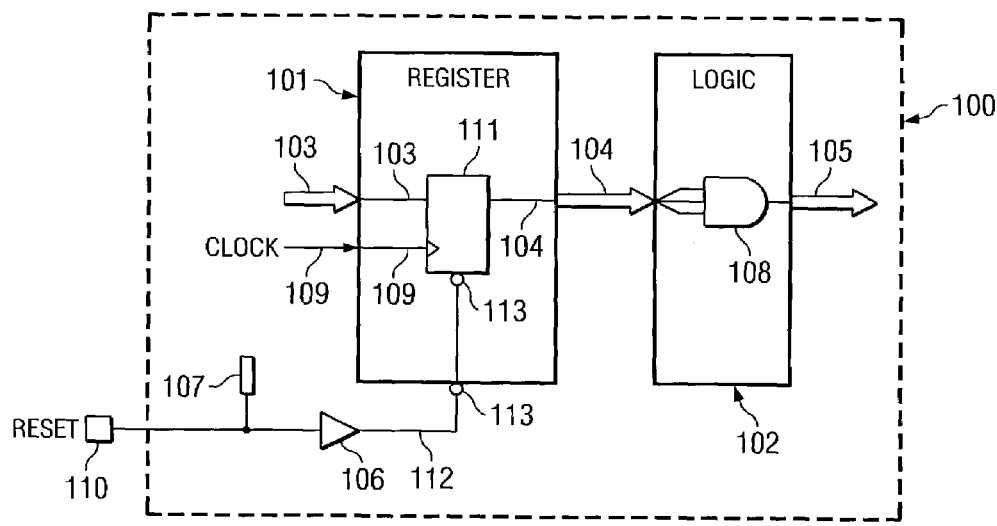
FIG. 1 illustrates an integrated circuit having a prior art asynchronous reset.
Figure 2:
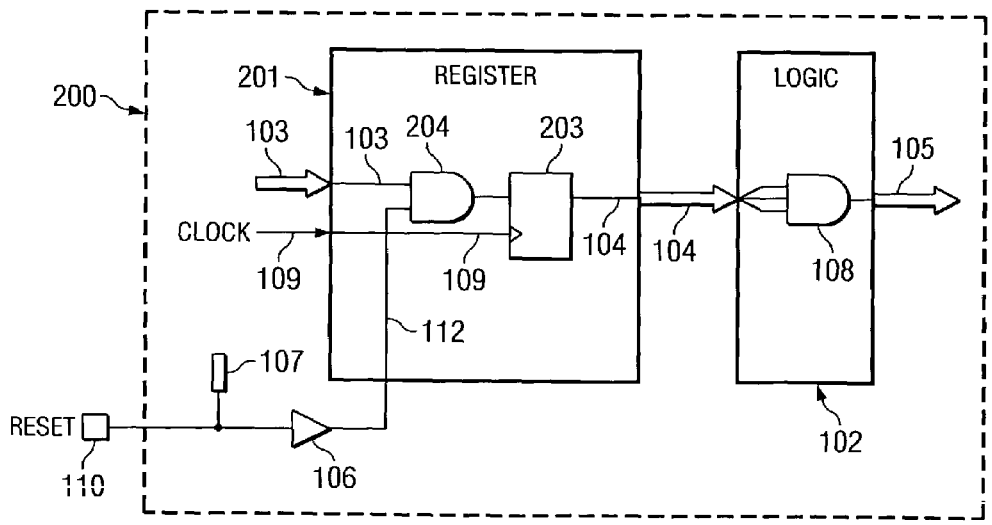
FIG. 2 illustrates an integrated circuit having a prior art synchronous reset.

The reset signal 304 to register 201 causes register 201 to operate as described in FIG. 2. The AND gate 204 supplies the input from bus 103 if reset signal 304 is high or a reset zero if reset signal 304 is low. The reset signal 304 to logic 301 causes logic 301 to operate as described in FIGS. 1 and 2 when reset signal 304 is high, or to force bus 105 from logic 301 to the reset state when reset signal 304 is low. Logic 301 and logic 102 is that the gating of logic 301 differ because logic 301 includes input 303 for receiving the reset signal 304.

When a reset input is applied to reset input 110, the reset output of flip-flop 307 goes low. This low is driven into register 201 and logic 301 via reset signal 304. In response to receiving the reset signal 304, the output bus 105 of logic 301 is immediately forced to the reset condition. When a clock 109 occurs, flip-flops of register 201 will be set to the reset state (zero), causing register 201 to output the reset state on bus 104 to logic 301. When the reset signal on reset input 110 returns high, the reset signal 304 output of flip-flop 307 will return high during a subsequent clock 109 input. When reset signal 304 returns high, exemplary AND gate 302 of logic 301 will be released from being directly controlled by the reset signal 304. However, the reset state on bus 104 from register 201 will continue to cause logic 301 to maintain the reset output state on bus 105 until a subsequent clock 109 changes the output bus 104 from the reset state to the next functional state following the reset state.

Thus the present invention as described in FIG. 3 provides the advantage of circuit 100 of immediately resetting the output bus of logic 301 in response to a reset signal at input 110 and the advantage of circuit 200 of lessening the possibility of noise causing false resets. Circuit 305 can be designed local to the reset input 110 pad of the IC. Further, circuit 305 can be robustly designed for external and internal noise immunity. The reset signal 304 does route from the localized reset circuit 305 to register 201 and logic 301 circuits and is thus susceptible to internal noise. However, such noise will be of a transient nature and typically minimized prior to the active edge of clock signal 109. So the likelihood of the register being reset by noise on reset signal 304 is remote. If the noise on reset signal 305 is substantial enough to disturb the logic 301, the disturbance will be momentary due the transient nature of the noise. In a synchronous circuit 300 a momentary disruption at the output 105 of logic 301 following the active edge of clock 109 is tolerable.

What is claimed is:

1. An integrated circuit comprising:
   an external reset input for receiving an external reset signal;
   a clock input for receiving a clock signal;
   a reset signal sub-circuit connected to said external reset input and said clock input and including an internal reset output connected to other circuits of said integrated circuit, said reset signal sub-circuit immediately supplying an internal reset signal on said internal reset output to reset said other circuits upon receipt of said external reset signal and ceasing to supply said internal reset signal on said internal reset output upon a next clock signal received at said clock input following ceasing to receive said external reset signal at said external reset input; and
   said other circuits includes a combinational logic circuit including an AND gate having at least one input receiving a corresponding data signal and a further input receiving said internal reset signal.

2. The integrated circuit of claim 1 wherein:
   said reset signal sub-circuit includes a flip flop having an asynchronous reset input connected to said external reset input, a clock input connected to said clock input, a data input connected to said external reset input, and a data output connected to said internal reset output.

3. The integrated circuit of claim 1 wherein:
   said other circuits includes a register having a plurality of bit circuits, each bit circuit having
      a flip flop with a clock input receiving said clock signal, a data input and a data output, and
      an AND gate having a first input receiving a bit input for said bit circuit, a second input receiving said internal reset signal and an output connected to said data input of said flip flop.

4. An integrated circuit comprising:
   an external reset input for receiving an external reset signal;
   a clock input for receiving a clock signal;
   a reset signal sub-circuit connected to said external reset input and said clock input and including an internal reset output connected to other circuits of said integrated circuit, said reset signal sub-circuit immediately supplying an internal reset signal on said internal reset output to reset said other circuits upon receipt of said external reset signal and ceasing to supply said internal reset signal on said internal reset output upon a next clock signal received at said clock input following ceasing to receive said external reset signal at said external reset input; and
   said other circuits includes a register having a plurality of bit circuits, each bit circuit having
      a flip flop with a clock input receiving said clock signal, a data input and a data output, and
      an AND gate having a first input receiving a bit input for said bit circuit, a second input receiving said internal reset signal and an output connected to said data input of said flip flop.

5. The integrated circuit of claim 4 wherein:
   said reset signal sub-circuit includes a flip flop having an asynchronous reset input connected to said external reset input, a clock input connected to said clock input, a data input connected to said external reset input, and a data output connected to said internal reset output.

* * * * *